(12) United States Patent
Fullington

(10) Patent No.: US 12,423,191 B1
(45) Date of Patent: Sep. 23, 2025

(54) REMOTE DATA MERGE SYSTEM AND METHOD

(71) Applicant: Hewlett Packard Enterprise Development LP, Spring, TX (US)

(72) Inventor: Robert Carter Fullington, Morristown, TN (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 0 days.

(21) Appl. No.: 18/670,983

(22) Filed: May 22, 2024

(51) Int. Cl.
*G06F 11/14* (2006.01)
*G06F 16/23* (2019.01)

(52) U.S. Cl.
CPC ...... *G06F 11/1461* (2013.01); *G06F 16/2365* (2019.01); *G06F 2201/80* (2013.01)

(58) Field of Classification Search
None
See application file for complete search history.

(56) References Cited

U.S. PATENT DOCUMENTS

| | | | |
|---|---|---|---|
| 10,346,373 B1 | 7/2019 | Kulshreshtha | |
| 2012/0179655 A1 | 7/2012 | Beatty et al. | |
| 2012/0226664 A1* | 9/2012 | Habermann | G06F 11/1469 |
| | | | 707/E17.005 |
| 2018/0322017 A1* | 11/2018 | Maccanti | G06F 11/1458 |
| 2021/0048995 A1* | 2/2021 | Myers | G06F 11/1469 |
| 2021/0149853 A1 | 5/2021 | Krause | |
| 2021/0342304 A1* | 11/2021 | Bangalore | G06F 16/2379 |
| 2022/0171748 A1 | 6/2022 | Bamel | |

FOREIGN PATENT DOCUMENTS

WO 2015117429 A1 8/2015

OTHER PUBLICATIONS

Redgate, Phil Factor, "Database Branching and Merging without the Tears," Mar. 23, 2023, 9 pages.

* cited by examiner

*Primary Examiner* — Eddy Cheung
(74) *Attorney, Agent, or Firm* — Slater Matsil, LLP

(57) ABSTRACT

A computer-implemented method is disclosed in which a number of remote database backups are received from remote locations. Containers are created where each container hosts remote data from a respective one of the remote database backups. The remote data from each container is merged with a target database. The method can be implemented, for example, in a cloud service.

19 Claims, 8 Drawing Sheets

REMOTE DATA MERGE SYSTEM AND METHOD

BACKGROUND

In the field of database management, databases are often used to store, manage, and retrieve information. These databases can be located in various locations, either locally or remotely. Each database typically contains multiple tables that store data in a structured format. The structure of a database is often defined by a database schema, which describes the design and organization of data in a database. A database schema can include tables, fields, relationships, indexes, and other constructs that organize and define the nature of the data.

In some scenarios, it may be desirable to merge data from multiple databases into a single target database. This process, known as database merging, involves combining data from different sources while maintaining the integrity and consistency of the data. The merging process can be complex, especially when dealing with large volumes of data or databases with complex structures.

BRIEF DESCRIPTION OF THE DRAWINGS

For a more complete understanding of this disclosure, and advantages thereof, reference is now made to the following descriptions taken in conjunction with the accompanying drawings, in which.

DESCRIPTION

The following disclosure provides many different examples for implementing different features. Specific examples of components and arrangements are described below to simplify the present disclosure. These are merely examples and are not intended to be limiting.

The present disclosure relates to a method for consolidating data from multiple databases into a single target database. This method is particularly useful for companies that are transitioning their data to a cloud-based storage system. Traditionally, merging data from multiple databases into a single database can be a time-consuming and labor-intensive process, especially when the databases are located in different geographical locations. This process often requires a substantial amount of manual work from database administrators, which can lead to increased costs and potential errors.

Disclosed implementations address these challenges by automating the process of merging data from multiple databases. The algorithm is designed to work with any software application or deployment tool and includes a parallel processing feature that allows multiple operations to be performed simultaneously, thereby reducing the overall processing time.

The algorithm begins by querying multiple databases to identify the data that is to be merged. It then creates a series of containers, each of which hosts data from a respective database. The data from each container is then merged into a target database. This process can be performed for any number of remote databases, making the algorithm scalable and adaptable to a variety of scenarios.

The algorithm also includes a feature for handling exceptions, such as primary and foreign keys constraint violations. This feature allows the algorithm to anticipate potential issues and handle them programmatically, further reducing the manual work involved in the data merging process.

As such, example implementations can provide an efficient and automated solution for consolidating data from multiple databases into a single target database. This method can greatly reduce the time and effort involved in data migration, for example, for companies transitioning to cloud-based storage systems.

Figure 1:
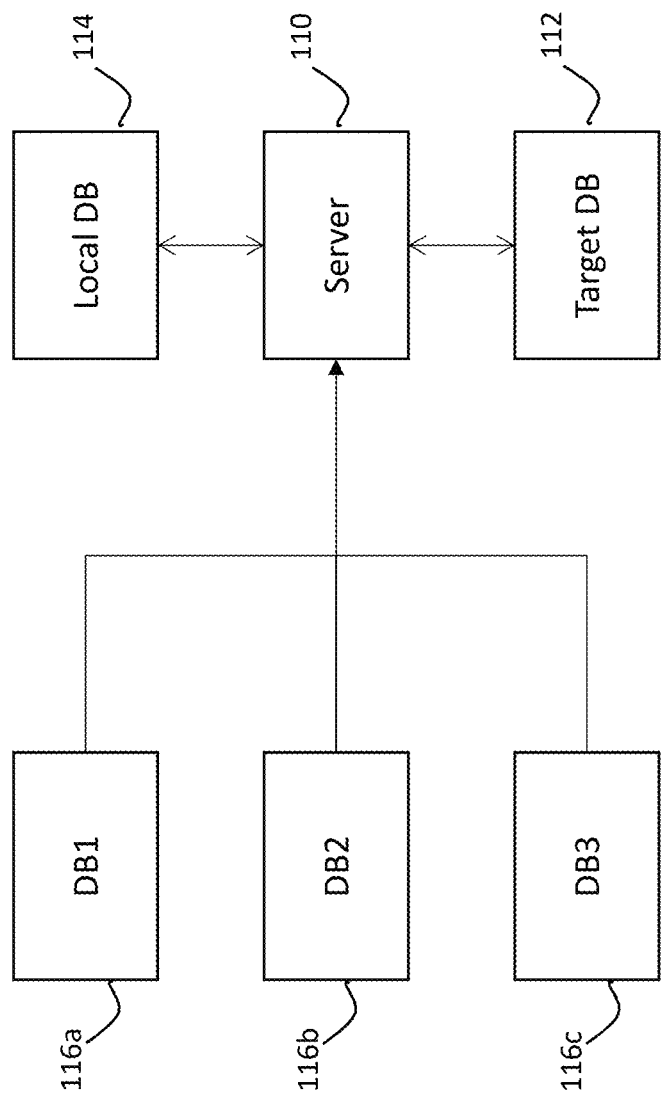
FIG. 1 is a schematic diagram illustrating a system for integrating multiple databases, according to some implementations.

FIG. 1 depicts a schematic diagram illustrating a system that can benefit from data consolidation from multiple source databases 116a-116c (collectively 116) into a single target database system 112. The system includes a server 110 that acts as an intermediary, coordinating the flow of data from the source databases 116 and a local database 114, which subsequently merges the data into the target database 112. While drawn as a single entity, it is understood that the server 110 functions could be distributed over multiple devices. Herein, the term server is intended to encompass either case.

The source databases include a first remote source database 116a, a second remote source database 116b, and a third remote source database 116c. These databases 116 are shown as individual entities that provide data to the server 110. It is understood that each remote location could include any number of databases 116. That is, any of the databases 116 may be one implemented as one or more databases.

In some implementations, the system receives a plurality of remote database backups from a plurality of remote locations. For instance, the first remote source database 116a, the second remote source database 116b, and the third remote source database 116c may each provide a backup of their respective data to the server 110. This allows the system to consolidate data from multiple remote databases into the target database 112.

The local database 114 may be a live database(s) that is local (or closest geographically as another option) to the target database 112. The server 110 represents multiple, temporary containers, e.g., SQL containers, that will not be used for any live data. These containers will be used for the process of restoring data from remote databases 116 and preparing for the merging of data and ultimately merging the data to the target database 112. Further detail on various implementations is provided below.

The use of containers, e.g., software that package code and all its dependencies, allows the application to run quickly and reliably from one computing environment to another. For example, the computing environment of each database 116 may be different from other databases to be merged. For example, one database might operate on a Linux server while another operates one a Windows server.

In other example, the algorithm described here can be consolidate databases across could computing environments such as HPE GreenLake, Amazon Web Services (AWS), Microsoft Azure, Google Cloud Platform (GCP), or other cloud providers.

The remote database backups can be configured for a particular database environment. The database environment can provide specific set of conditions, configurations, and resources under which a database operates. Database environments can vary depending on the stage of development, the purpose of the database, and the requirements of the organization. For example, the remote source databases 116 may be configured for a production environment, for a testing environment, or for a development environment.

The development environment can allow developers create, modify, and test database code and structures. This environment may have less strict security measures and may not contain real or sensitive data. The testing environment can be used to evaluate the database's functionality, performance, and compatibility with other systems. For example, this environment can aim to simulate the production environment as closely as possible to ensure that the database will work as expected when deployed. Finally, the database can be actively used by end-users and contains live, real-world data in the production environment. This environment typically has the highest level of security, performance optimization, and data integrity measures in place. Each environment may have different hardware and software configurations, access controls, and backup and recovery procedures to suit its specific purpose and ensure the smooth operation of the database. The implementations described herein allow the system to consolidate data from databases configured for any of the environments into the target database 112.

The target database 112 may a destination in a cloud-based system. This allows the system to leverage the scalability and flexibility of cloud computing, enabling it to handle large volumes of data and accommodate varying workloads. The cloud service may also provide additional features such as automated backups, data replication, and disaster recovery. The use of a cloud service can also facilitate access to the consolidated data in the target database 112 from various locations, making it particularly suitable for companies with geographically dispersed operations.

In example implementations, replication in a cloud environment to enable high availability. Cloud storage replication involves creating and maintaining multiple copies of data across different storage servers or regions within a cloud provider's infrastructure. This replication can enhance data durability, availability, and disaster recovery by storing data in multiple locations. The replication can be, for example, region replication where data is replicated across different geographic regions to protect against regional outages or zone replication where data is replicated across different availability zones within a region for increased fault tolerance.

In an SQL environment, SQL Always On can be used for high availability and disaster recovery. A group of databases can be replicated across multiple SQL Server instances, providing redundancy and automatic failover capabilities. One instance can act as the primary replica, handling read-write operations, while one or more secondary replicas serve as standby copies. If the primary replica becomes unavailable, one of the secondary replicas can automatically take over as the new primary, ensuring minimal downtime and data loss.

One example of the use of this feature would be an SQL cluster, which can provide a group of interconnected virtual machines or instances that work together to provide high availability and scalability for SQL Server databases. The cluster typically includes multiple nodes, each running an instance of SQL Server, that collaborate to ensure continuous availability of the database services. The nodes in the cluster can share storage resources, typically using shared disk solutions or cloud-based storage services, allowing them to access the same database files simultaneously.

Figure 2:
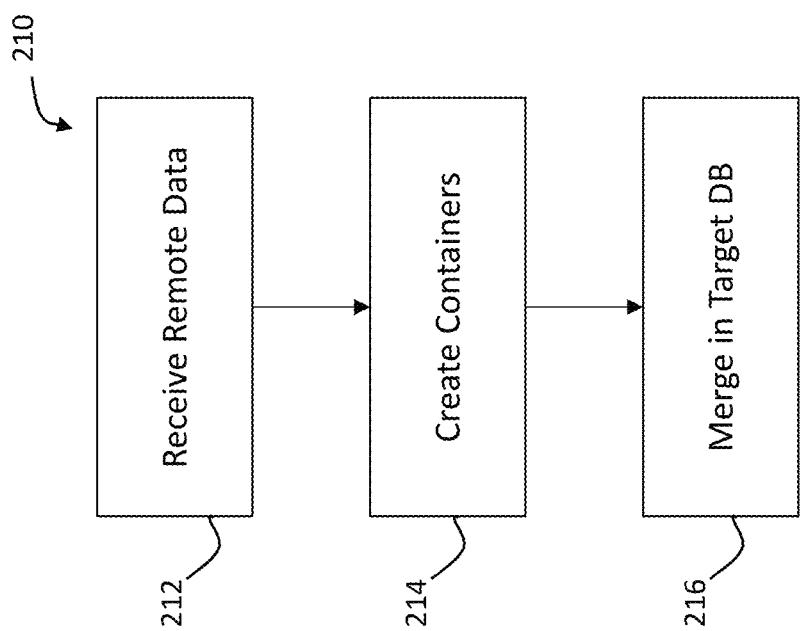
FIG. 2 is a flowchart illustrating a process, according to some implementations.

As shown by flowchart 210 of FIG. 2, in some implementations, the system may perform the operations of receiving the remote database backups, creating the containers, and merging the remote data at a target database server, with the target database 112 being stored at the target database server. This allows the system to consolidate data from multiple remote databases into a single target database server, thereby simplifying the data consolidation process.

This simplified representation of the process begins with a first step 212, where remote data is received for processing. This step may involve receiving data from multiple remote databases 116, each of which may be located in a different geographical location. The data received may include various types of information, such as records, tables, or other data structures, depending on the specific requirements of the data consolidation process.

Following the receipt of remote data, the flowchart 210 progresses to step 214, indicating the creation of containers to hold the data temporarily. These containers may be created on a server 110, such as a database server or a cloud server, and may be configured to host the remote data received from the respective databases 116. The creation of containers provides a temporary storage space for the remote data, allowing the data to be managed and manipulated in a controlled environment before being merged into the target database 112.

As noted above, each container can package code and all its dependencies so the application runs quickly and reliably from one computing environment to another. In this case, each container is created to host remote data from a respective one of the remote database backups during the data migration process. These containers provide a temporary storage space for the remote data, allowing the data to be managed and manipulated in a controlled environment before being merged into the target database.

In example implementations, each container can be created by initializing a virtualized environment, e.g., on server 110 such as a database server or a cloud server, which is configured to host remote data from a respective one of the remote database backups. This process may start with allocating resources such as memory, storage, and processing power to the container. The server may then deploy a containerization platform, such as Docker, to create an isolated instance that encapsulates the database environment, including the database engine and the remote data.

In some cases, the container may be configured as an SQL container, which is specifically designed to manage SQL database operations, such as queries and updates. The container creation process may also include setting up network configurations to allow communication between the container and other components of the system, as well as implementing security measures to protect the data and the integrity of the containerized environment. Once the container is created, it can be used to manage and manipulate the remote data before merging it into the target database.

The final step 216 shown in the flowchart indicates that the remote data from each container is merged into the target database 112, completing the data consolidation process. This step involves consolidating the remote data from each container into a single target database 112, thereby creating a unified database that contains data from multiple remote databases 116 as well as local database 114. This merging process may involve various operations, such as data transformation, data mapping, or data integration, depending on the specific requirements of the data consolidation process. Examples are discussed below.

In example implementations, the receipt of the remote database backups, creation of the containers, and merging of the remote data are performed in parallel for each remote database backup. This parallel processing approach can enhance the efficiency of the data consolidation process by allowing multiple operations to be performed simultaneously. For instance, while the server 110 is receiving a backup from a first remote database 116a, it may also be merging data from a third remote database 116c into the target database. This parallel processing can reduce the overall time taken for the data consolidation process, particularly when dealing with a large number of remote databases. The capability of handling multiple remote databases simultaneously provides for scalability of the method.

As indicated above, the merging of the remote data from each container with a target database may be performed by a server 110, i.e., a computing system. The server 110 may execute a series of instructions or operations to merge the remote data into the target database. These instructions or operations may include various database operations, such as insert, update, or delete operations, as well as various data manipulation operations, such as data transformation, data mapping, or data integration operations. The server may also handle any exceptions or errors that may occur during the merging process, ensuring that the data consolidation process is completed successfully.

Figure 3:
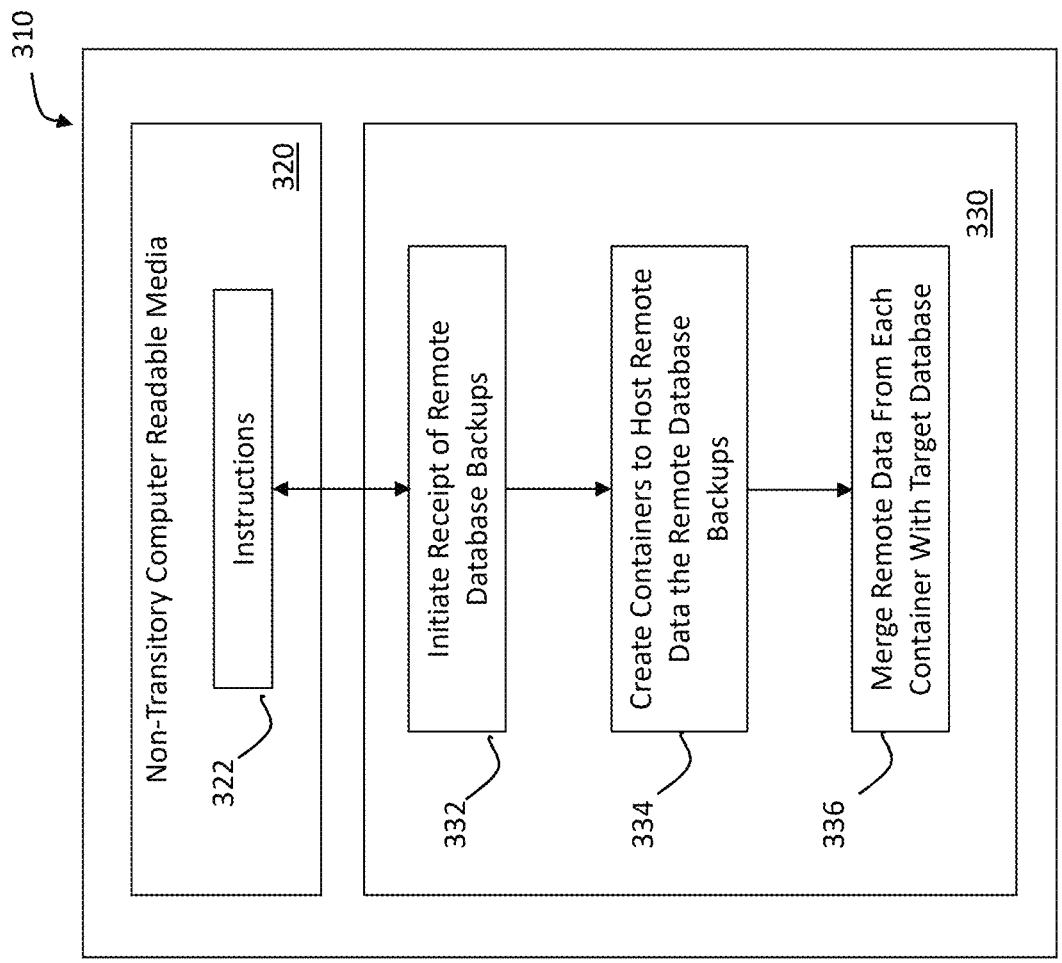
FIG. 3 depicts a simplified schematic diagram of a computer system, according to implementations.

FIG. 3 depicts a simplified schematic diagram of an example implementation of such a server 310. The server 310 includes a non-transitory computer readable media 320 that stores executable instructions 322. These instructions 322 implement the migration process when executed by one or more processors 330. The migration process involves a series of steps, starting with step 332, where the receipt of remote database backups is initiated. Following this, the create containers step 334 involves creating containers to host the remote data from the database backups. The process culminates with the merge data step 336, where the remote data from each container is merged with a target database, completing the data consolidation process. More detailed examples are discussed below.

In some aspects, the method implemented by the server 310 may be embodied in computer code stored on a non-transitory computer readable medium 320. This medium could be any type of storage device or medium capable of storing data in a non-transitory manner, such as a hard drive, a solid-state drive, a flash memory device, or an optical disc, as examples. The non-transitory memory could also be implemented as a volatile memory such as an SRAM or DRAM. The computer code may include a set of instructions that, when executed by one or more processors 330, cause the one or more processors to perform the various steps and operations of the migration process as described above.

Figure 4:
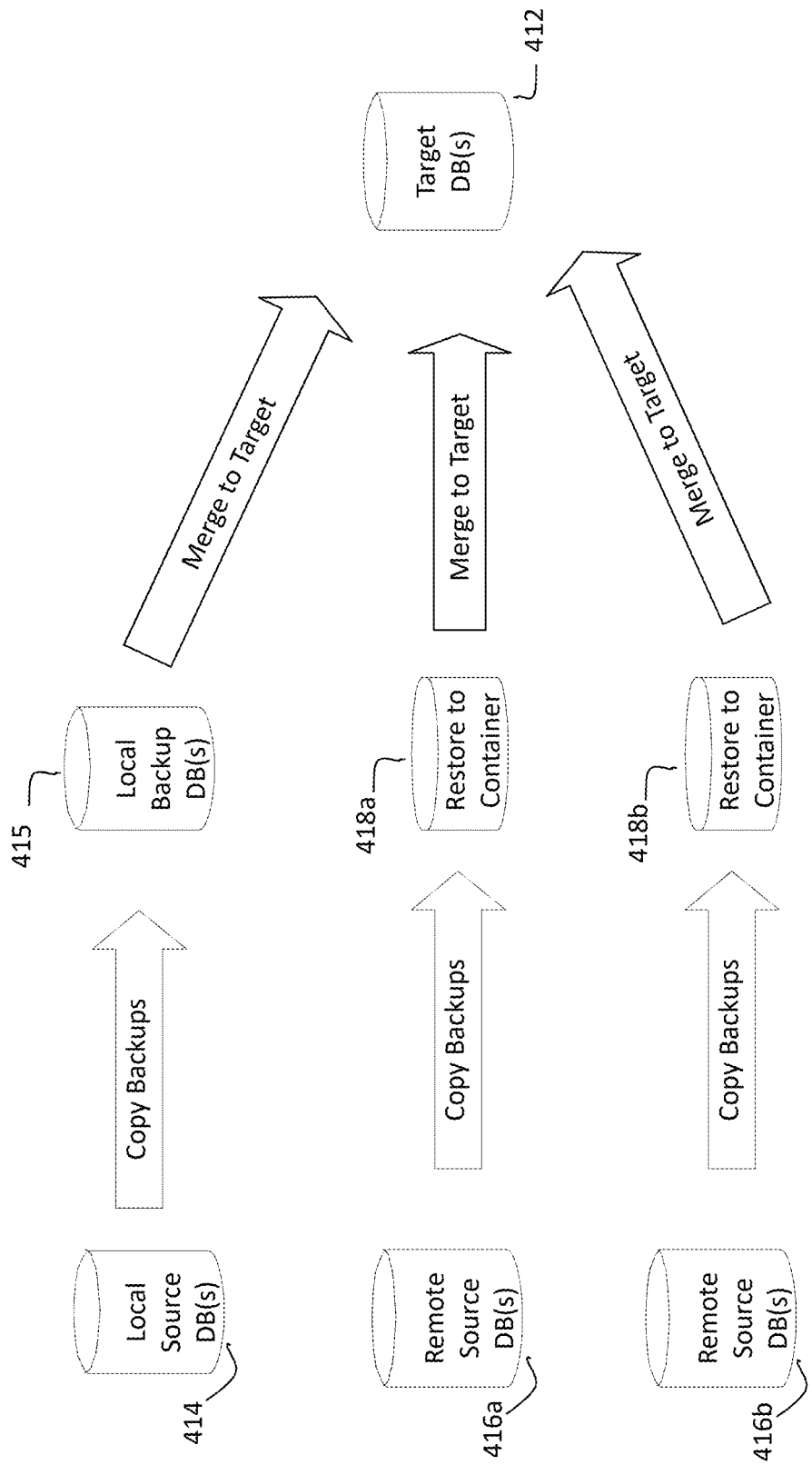
FIG. 4 depicts a process of merging data from multiple source databases, according to some implementations.

FIG. 4 depicts a process of merging data from multiple source databases 414, 416a, and 416b into a single target database 412. The local source database 414 is backed up to local backup database 415. The local backup database 415 is located at the same location (the local location) of the target database 412. The local source database 414 may be located at the local location or a remote location that is remote relative to the local location. When no database to be merged is at the local location, the local source database 414 is a selected one of the remote databases, e.g., the database physically closest to the local location. When more than database is at the local location, one will be selected as the local database 414.

Simultaneously, the remote source databases 416a and 416b (collectively 416) are backed up and copied to the local location. These backups are then restored to their respective containers 418a and 418b (collectively 418). While two remote source databases 416 are depicted in this figure, as discussed herein, the number of databases to be merged is not limited. In fact, the parallel nature of the process provides an advantage in that the merging is more efficient as the number of remote sources goes up.

Finally, all data from the local and remote sources are merged into the target database 412, completing the consolidation process. This restoration may involve concurrently copying the data from the local source database 414 and remote source database(s) 416 to the target database 412, thereby ensuring that the data in the target database 412 is an accurate and up-to-date representation of the original source data.

Figure 5:
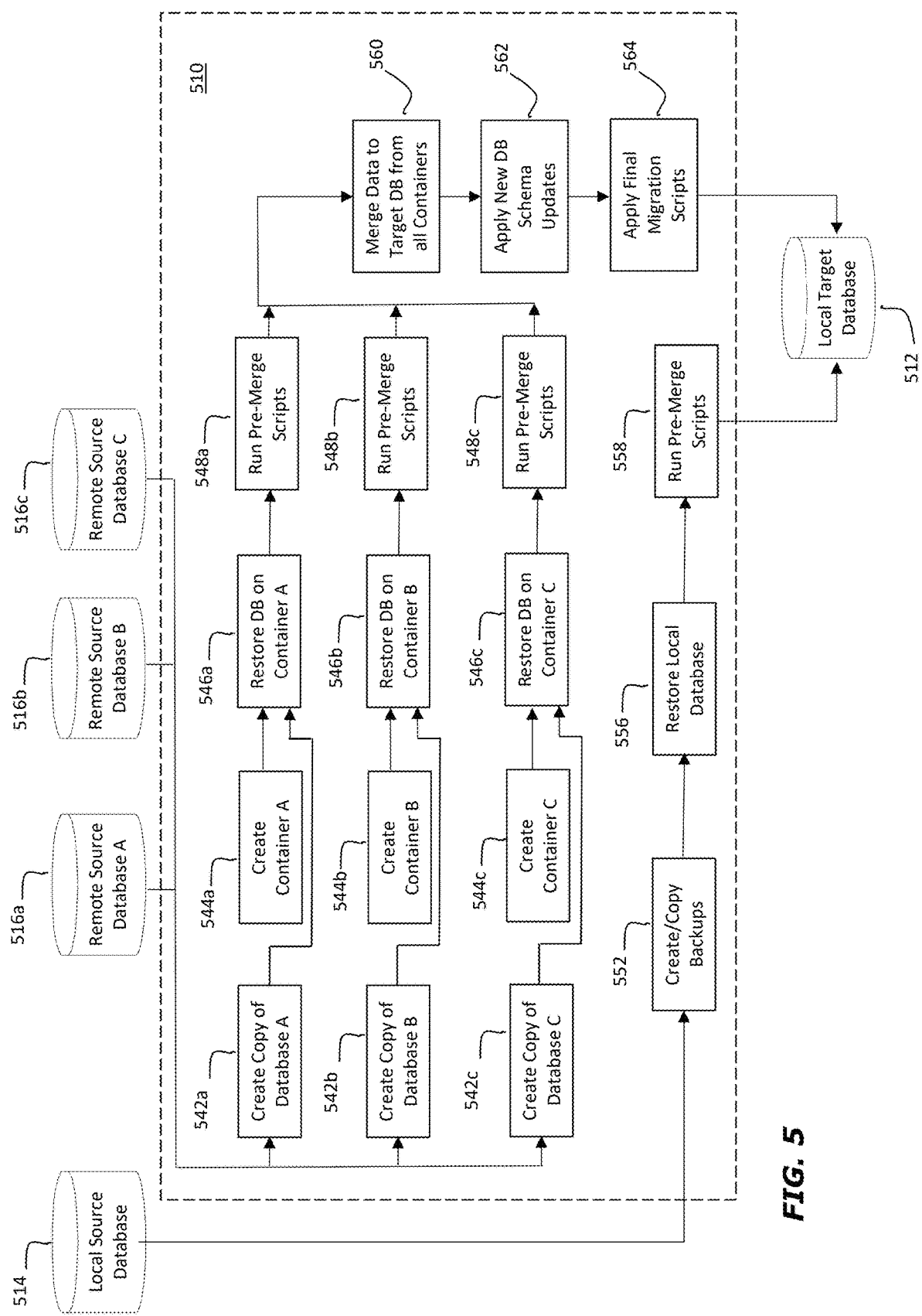
FIG. 5 depicts a flowchart illustrating an example algorithm that can be executed to merge databases, according to some implementations.

FIG. 5 depicts a flowchart 510 illustrating an example algorithm that can be executed to merge databases from the local database 514 and remote databases 516a, 516b, 516c (collectively 516) into a single target database server 512. The flowchart 510 depicts the parallel nature of the algorithm where processing on each branch (e.g., steps 542, 544, 546, 548 and steps 552, 556, 558) is performed concurrently and independently. As such, the each step for different ones of the databases might be completed at different times.

The illustrated process begins with backups being created for remote databases 516 and local database 514, as indicated by steps 542a, 542b, 542c (collectively 542), and 552, respectively. As discussed, in example implementations, these backups may be created simultaneously, leveraging the power of parallel processing to expedite the data consolidation process.

Simultaneously, containers are prepared for each remote source database, as shown in steps 544a, 544b, and 544c (collectively 544). These containers, which may be SQL containers in some implementations, serve as temporary hosts during the transition, where databases are restored as indicated by steps 546a, 546b, and 546c (collectively 546). In some cases, the creation of a first one of the containers may be completed before creating a second one of the containers. This allows the remote data from the first one of the containers to be merged with the target database while the second one of the containers is still being created, thereby optimizing the use of system resources and reducing the overall processing time.

Pre-merge scripts are then run on each container to prepare the data for merging, as shown in steps 548a, 548b, and 548c (collectively 548). These scripts may perform various data manipulation operations, such as data transformation, data mapping, or data integration, to ensure that the data is in the correct format and structure for merging into the target database. These scripts can act as a bridge between the source databases and the target database, facilitating the smooth and efficient transfer of data. The scripts can implement operations that not just move the data from one place to another but integrate the data in a way that maintains data integrity, consistency, and usability in the target database.

One example of such an operation is data transformation, which involves converting data from its original format or structure in the source databases into a format or structure that is compatible with the target database. This could involve changing data types, encoding formats, or other data attributes to ensure consistency and compatibility across all databases involved in the merge.

Another operation that can be performed is data mapping, which involves establishing a relationship or correspondence between the data elements in the source databases and the corresponding data elements in the target database. This step can ensure that each piece of data from the source databases is correctly placed in the appropriate location in the target database. Data mapping can also involve the creation of new data elements or the modification of existing ones to better fit the structure of the target database.

Data integration is another operation that can be performed by these scripts. This involves combining data from different source databases in a way that maintains data integrity and consistency. Data integration can be a complex process, especially when dealing with large volumes of data or databases with complex structures. This step can ensure that the consolidated data in the target database is a complete and accurate representation of the data in the source databases.

The data stored in the containers can be merged into the target database server, as depicted by step 560. In an example implementation, this process begins with the system identifying the containers that hold the data to be merged. The system then initiates the merging process, which involves consolidating the data from each container into the target database server, e.g., using advanced algorithms and techniques to accurately merge the data, taking into account factors such as data types, relationships, and constraints. During the merging process, the system also checks for any potential conflicts or issues, such as duplicate entries or incompatible data types. If any such issues are detected, the system handles them appropriately to ensure that the merged data is accurate and consistent.

Once the data is merged, new database schema updates are applied in step 562. In example implementations, the application of new database schema updates may occur post-merger of the remote data into the target database. This process may involve analyzing the existing schema of the target database and comparing it with the intended new schema updates to identify any differences or modifications that are to be implemented. Once identified, the system may execute a series of statements or scripts that alter the database structure, which may include adding, modifying, or dropping tables, columns, indexes, constraints, and other database objects to reflect the new schema. In some cases, this process may also involve data migration or transformation to ensure compatibility with the new schema. The updates may be applied in a manner that minimizes downtime and maintains data integrity, often using transactional operations that allow for rollback in case of errors.

Step 564 depicts the execution of final migration scripts. In example implementations, the execution of final migration scripts represents a concluding phase in the data consolidation process. After the remote data has been successfully merged into the target database, these scripts may be executed to perform any remaining data manipulation tasks, such as data cleaning, deduplication, or indexing. The final migration scripts may also include commands to update system logs, audit trails, or trigger notifications to stakeholders indicating the completion of the migration process. In some cases, these scripts can be designed to validate the integrity of the merged data, ensuring that all data has been transferred correctly and is consistent with the source databases. The execution of these scripts can help to ensure that the target database is fully prepared for operational use, with all data properly integrated and all system functionalities tested and verified. This step may also involve making any final adjustments to database configurations or settings to optimize performance and ensure compliance with security and regulatory requirements.

In example implementations, each container is created after receipt of the respective one of the remote data backups at a time that is independent of when receipt of any other remote data backup is complete. This allows the system to handle multiple remote databases simultaneously allowing for scalability of the method. Furthermore, the remote data from each container is merged with the target database after completion of creation of that container and at a time that is independent of when creation of any other container is complete. This allows the data consolidation process to not be delayed by the creation of any particular container.

While the data from the remote databases 516 are being processed, the system may also be processing the data from the local source database 514. This process includes creating or copying backups in step 552, restoring the local database in step 556, and running additional pre-merge scripts in step 558. In some cases the local source database 514 is already co-located with the local target database 512 and, as such, steps 552 and 556 may be omitted. As discussed above, the local source database 514 may selected from one of the remote source databases.

As discussed herein, the server 110 may perform operations in parallel, including causing the remote database backups to be created by backing up remote databases 516, creating initial containers that will become the containers that host the remote data, and determining whether or not a local database 514 exists. In response to determining that the local database 514 exists, the server may restore the local database 514 to the target database server 512. In response to determining that no local database exists, the server 110 may create an empty database as the target database 512.

Figure 6:
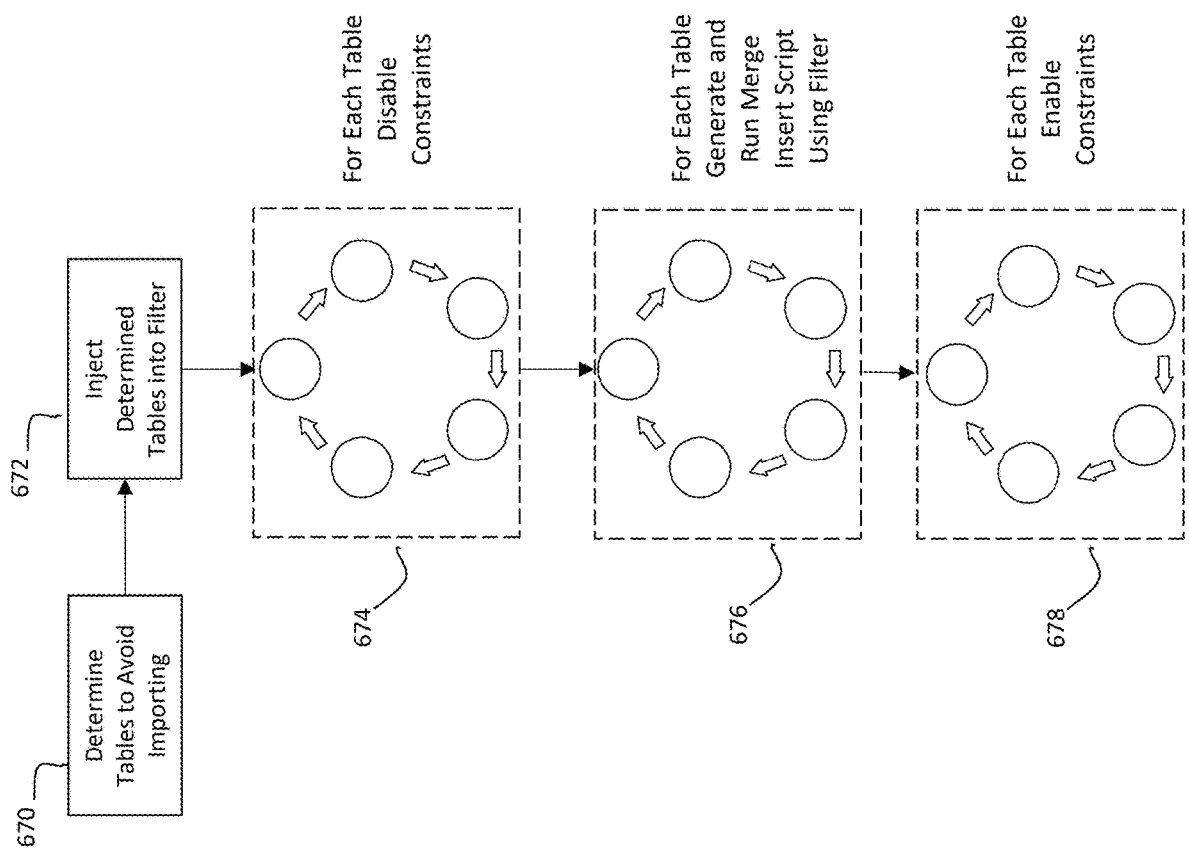
FIGS. 6 and 7 depict flowcharts illustrating a sequence of steps in a database management process, according to some implementations.

FIG. 6 depicts a flowchart illustrating the steps of an example implementation of a data merge process in a database management system. The process begins by determining which tables to avoid importing in step 670. The step identifies specific tables that may not be included in the data import to prevent duplication. This step may involve analyzing the structure and content of the tables in the source databases and identifying any tables that contain duplicate or redundant data. In other cases, tables that are used for documentation can be eliminated as unnecessary or tables with a large amount of data that that is not needed can be eliminated to speed up the process.

Following this, the process progresses to inject the tables into a filter as depicted by step 672. In this step, the identified tables can incorporated into a filter mechanism for later use in the merge process. This filter mechanism may be used to selectively import data from the source databases, excluding the data identified in step 670.

Subsequently, for each table, constraints are disabled in step 674 to allow for unobstructed data manipulation during the merge. This step may involve disabling various types of constraints, such as primary keys, foreign keys, or check constraints, which could potentially interfere with the data merge process. By disabling these constraints, the system can freely manipulate and merge the data without being hindered by the constraints.

In a SQL environment, as an example, constraints case be disabled using the ALTER TABLE statement with the NOCHECK option. For example, the "ALTER TABLE

[table_name] NOCHECK CONSTRAINT [constraint_name];" statement can be used to disable a specific constraint on a table. Similarly, the "ALTER TABLE [table_name] NOCHECK CONSTRAINT ALL;" statement can be used to disable all constraints on a table at once.

The next step involves generating and running a merge insert script for each table in step 676, utilizing the filter to selectively import data while avoiding duplicates and unneeded entries. This step may involve generating SQL scripts that perform insert operations on the target database, using the data from the source databases. The scripts may be designed to use the filter mechanism to selectively import data, excluding the data from the identified tables. This can help to ensure that the data in the target database is a complete and accurate representation of the data in the source databases, without any duplicates or redundancies. A more detailed example of this step is depicted in FIG. 7.

Finally, for each table, constraints are re-enabled in step 678 to maintain the relational rules within the database after the merge is complete. This step may involve re-enabling the constraints that were previously disabled. In a SQL environment, for example, the constraints can be re-enabled using the ALTER TABLE statement with the CHECK option to ensure data integrity is maintained. This can help to ensure that the data in the target database adheres to the same relational rules and constraints as the data in the source databases.

In some aspects, for each container, creating the container may comprise disabling constraints for each table in the remote database backup. After disabling the constraints for each table, generating and running a merge insert script using a filter and, after generating and running the merge insert script, enabling the constraints for each table. This process may be performed for each container that hosts remote data from a respective one of the remote database backups.

Figure 7:
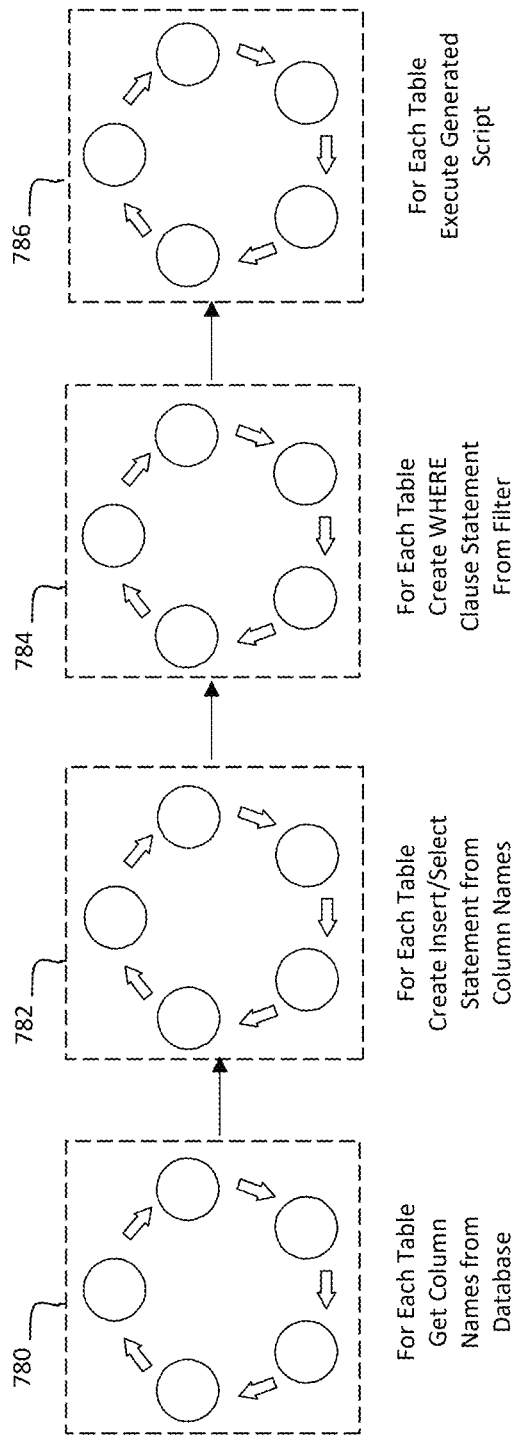

FIG. 7 illustrates a flowchart depicting a sequence of steps in a database management process in an SQL implementation. The process begins with step 780, which involves retrieving column names from each table in the database. This step may involve querying the database schema to identify the names of the columns in each table. The retrieved column names may then be used to generate SQL statements for merging the data from the source databases into the target database.

Following the retrieval of column names, the process progresses to step 782, which involves creating SQL insert/select statements from the retrieved column names. These statements may be used to insert data into the target database or select data from the source databases for merging. The insert/select statements may be generated based on the structure and content of the source databases, ensuring that the data is correctly mapped and transferred to the target database.

Step 784 involves creating SQL WHERE clause statements from the previously determined filter. This filter may be used to selectively import data from the source databases, excluding data from specific tables or columns that have been identified as unnecessary. The WHERE clause statements may specify conditions that the data in the source databases should meet in order to be included in the merge. The clause allows retrieval of only the data that meets the specified criteria.

The final step in the sequence is the SQL script execution step 786, which involves executing the generated SQL script for each table. This step may involve running the SQL INSERT/SELECT statements and WHERE clause statements on the source databases. The INSERT statement can be used to add new records (e.g., rows) into a database table and the SELECT statement can be used to retrieve data from one or more database tables based on specified criteria. The execution of the SQL script may be performed by a server or a computing system as discussed herein.

The specific example describe herein uses SQL (structured query language), which is a commonly used programming language for storing and processing information in a relational database. While SQL is the most widely used language for managing relational databases, there are several alternative technologies and approaches that could be used as well. One example of an alternative is NoSQL (Not Only SQL) databases, which offer a flexible and scalable approach to data storage and retrieval. NoSQL databases, such as MongoDB, Cassandra, and Couchbase, store data in a non-tabular format and are designed to handle large volumes of unstructured or semi-structured data. For example, NoSQL databases can be used in web applications, real-time analytics, and big data scenarios where traditional SQL databases may struggle to keep up with the demands of the application.

Another alternative to SQL is the use of an object-oriented database management system (OODBMS) such as db4o and Versant. These databases are designed to store and manage complex data structures and objects directly, without the need for an object-relational mapping (ORM) layer. OODBMS offer tight integration with object-oriented programming languages and provide features like object persistence, object-level querying, and support for complex relationships between objects. For example, OODBMS can be used for applications with complex data models and those that desire close integration between the database and the application code.

In some aspects, generating and running the merge script may comprise, for each table, getting column names from the remote database backup, creating an insert/select statement from the column names, creating a where clause statement from the filter, and executing the merge insert script. This process may be performed for each table in the source databases, ensuring that the data from each table is correctly mapped and transferred to the target database.

Figure 8:
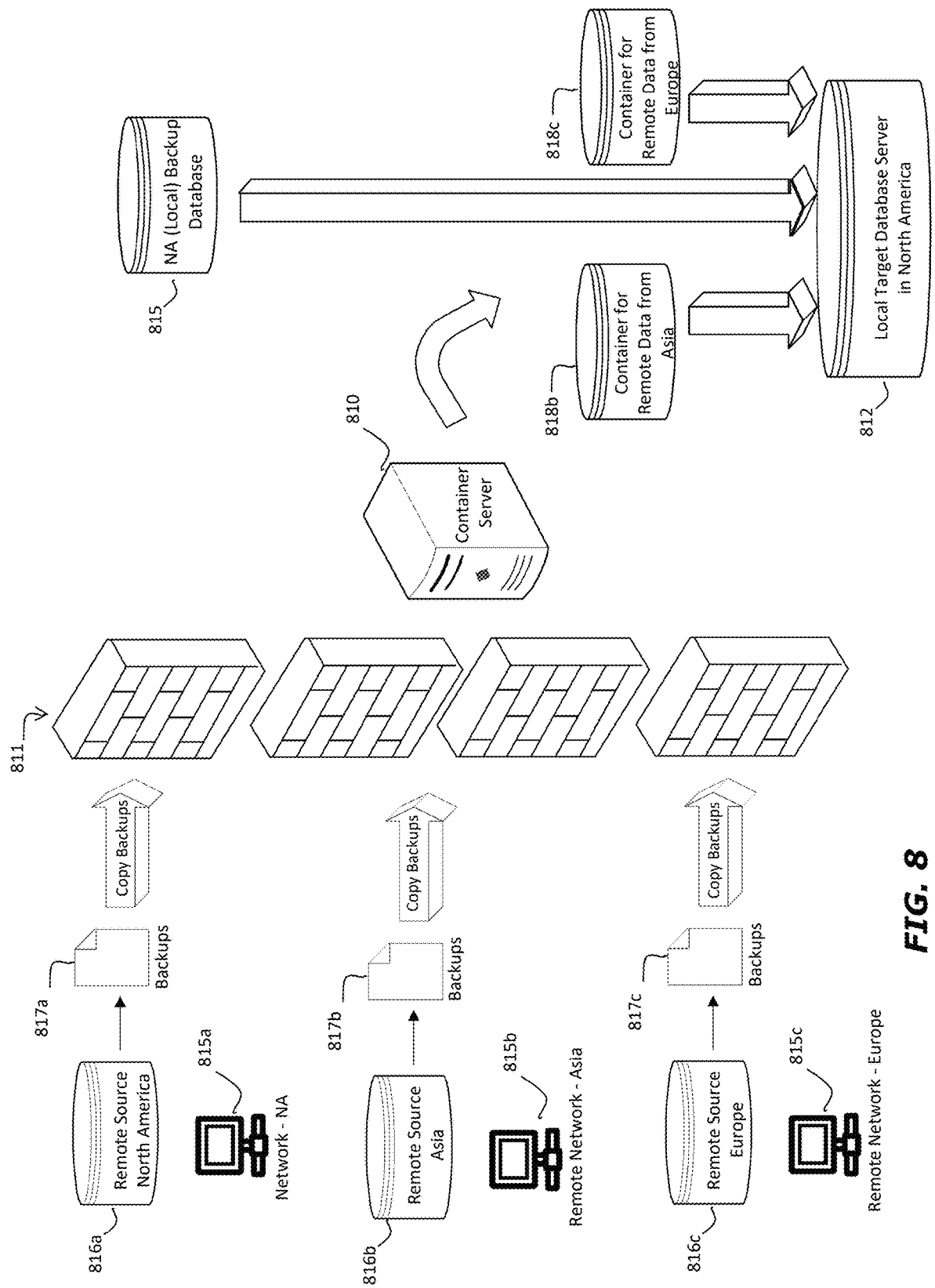
FIG. 8 depicts a combination block diagram and flowchart depicting the process of merging data from multiple source databases, according to some implementations.

FIG. 8 illustrates a combination block diagram and flowchart depicting the process of merging data from multiple source databases 816 into a single local target database server 812. Here firewall 811 is used to represent the demarcation between the remote locations and the local location, which includes the container server 810 and local target database server 812. In this arbitrary example, remote locations include North America, Asia and Europe while the local location is in North America. In general, the remote network location includes a computer, server, or device that is situated outside of the local network while the local network location includes resources that are directly connected to or within the same local area network (LAN) as the accessing device. The remote devices can communicate with the local location through the Internet or another wide area network (WAN), as examples. In another example, a remote location might be physically close the local location but part of a different local network.

In this example, databases from three remote locations will be merged. In this case, source database 816*a* is connected to a North American network 815*a*, source database 816*b* is connected to an Asian network 815*b*, and source database 816*c* is connected to a European network 815*c*. The goal of this process is to merge data from these three remote sources into a single target location.

In this case, no database to be merged is co-located with the target database 812. Since it is assumed that the container server 810 and local target database server and located in North America, data from remote source 816*a* will be backed up to create backups 817*a*. These backups 817*a* can then be transferred to the local backup database 815. In other examples, other criteria may be used to determine the source of the local database 815. For example, the database backups that can be transferred most quickly can be the source for the local database. Any other criteria could alternatively be used.

Backups 817*b* and 817*c* are created from the remote sources 816*b* and 816*c*. These backups can then be copied to the container server 810, which will create the containers 818*b* and 818*c* as discussed herein. The data from local backup database 815 and containers 818*b* and 818*c* can be merged to create a single, integrated database by the local target database server 812.

In some embodiments, the disclosed methods and systems may be implemented as part of a cloud service. The cloud service may provide a scalable and flexible infrastructure that can handle large volumes of data and accommodate varying workloads. The cloud service may also provide additional features such as automated backups, data replication, and disaster recovery, further enhancing the reliability and robustness of the data consolidation process. The use of a cloud service can also facilitate access to the consolidated data in the target database from various locations.

A number of different aspects and features have been described herein. It is understood that features discussed with respect to one of the figures can be combined with features discussed with respect to other figures. For sake of simplicity, all possible combinations have not be explicitly depicted.

Although this disclosure describes or illustrates particular operations as occurring in a particular order, this disclosure contemplates the operations occurring in any suitable order. Moreover, this disclosure contemplates any suitable operations being repeated one or more times in any suitable order. Any suitable operation or sequence of operations described or illustrated herein may be interrupted, suspended, or otherwise controlled by another process, such as an operating system or kernel, where appropriate. The acts can operate in an operating system environment or as stand-alone routines occupying all or a substantial part of the system processing.

While this disclosure has been described with reference to illustrative implementations, this description is not intended to be construed in a limiting sense. Various modifications and combinations of the illustrative implementations, as well as other implementations of the disclosure, will be apparent to persons skilled in the art upon reference to the description. It is therefore intended that the appended claims encompass any such modifications or implementations.

What is claimed is:

1. A computer-implemented method comprising:
    performing first operations in parallel, the first operations comprising:
        causing a plurality of remote database backups to be created by backing up remote databases;
        receiving the plurality of remote database backups from a plurality of remote locations;
        creating a plurality of initial containers, each container hosting remote data from a respective one of the remote database backups, wherein each container includes software and dependencies;
        determining whether or not a local database exists and, in response to determining that the local database exists, restoring the local database to a target database and, in response to determining that the local database does not exist, creating an empty database as the target database; and
        merging the remote data from each container with a target database;
    wherein receiving the plurality of remote database backups comprises beginning to receive each remote database backup upon completion of that remote database backup being created;
    wherein creating the plurality of containers comprises beginning to create each container upon receipt of the remote data for that container;
    wherein merging the remote data from each container comprises beginning to merge the remote data from each container upon completion of creating that container; and
    wherein timing of the receiving, creating, and merging for each remote database is independent of timing of the receiving, creating, and merging of each other remote database.

2. The method of claim 1, further comprising restoring a local database to the target database.

3. The method of claim 1, wherein the containers are created in parallel.

4. The method of claim 3, wherein creating a first one of the containers is completed before creating a second one of the containers is completed and wherein the remote data from the first one of the containers is merged with the target database while the second one of the containers is still being created.

5. The method of claim 1, wherein creating the plurality of containers comprises creating a plurality of SQL containers.

6. The method of claim 1, wherein the plurality of remote database backups includes a first remote database backup configured for a first environment and a second remote database backup configured for a second environment, the first environment being different than the second environment.

7. The method of claim 1, wherein receiving the remote database backups, creating the containers, and merging the remote data are performed at a target database server, the target database being co-located with the target database server.

8. The method of claim 1, wherein receiving the plurality of remote database backups comprises receiving at least three remote database backups.

9. The method of claim 1, wherein each container is created after receipt of the respective one of the remote data backups at time that is independent of when receipt of any other remote data backup is complete; and
    wherein the remote data from each container is merged with the target database after completion of creation of that container and at a time that is independent of when creation of any other container is complete.

10. The method of claim 1, wherein, for each container, creating the container comprises:
    disabling constraints for each table in the remote database backup; after disabling the constraints for each table, generating and running a merge insert script using a filter; and
    after generating and running the merge insert script, enabling the constraints for each table.

11. The method of claim 10, wherein generating and running the merge insert script comprises:
   for each table, getting column names from the remote database backup;
   for each table, creating an insert/select statement from the column names;
   for each table, creating a where clause statement from the filter; and
   for each table, executing the merge insert script.

12. A non-transitory computer readable medium storing computer code that, when executed on a computer, cause the computer to perform the method of claim 1.

13. A server comprising:
   one or more processors; and
   non-transitory memory storing instructions that, when executed by the one or more processors cause the one or more processors to:
   perform first operations in parallel, the first operations comprising:
      causing a plurality of remote database backups to be created by backing up remote databases;
      initiate receipt of remote data from the plurality of remote database backups;
      create a plurality of initial containers, each container hosting remote data from a respective one of the remote database backups, wherein each container includes software and dependencies;
      determine whether or not a local database exists and, in response to determine that the local database exists, restore the local database to a target database and, in response to determine that the local database does not exist, create an empty database as the target database; and
      merge the remote data from each container with a target database;
      wherein receipt of remote data from the plurality of remote database backups comprises beginning to receive each remote database backup upon completion of that remote database backup being created;
      wherein create the plurality of containers comprises beginning to create each container upon receipt of the remote data for that container:
      wherein merge the remote data from each container comprises beginning to merge the remote data from each container upon completion of creating that container; and
      wherein timing of the receive, create, and merge for each remote database is independent of timing of the receive, create, and merge of each other remote database.

14. The server of claim 13, wherein instructions cause the one or more processors to initiate receipt of the remote database backups, create the containers, and merge the remote data in parallel for each remote database backup.

15. The server of claim 13, wherein the plurality of remote database backups includes a first remote database backup configured for a first computing environment and a second remote database backup configured for a second computing environment, the first computing environment being different than the second computing environment.

16. The server of claim 13, wherein instructions cause the one or more processors to initiate receipt of least three remote database backups.

17. A system comprising:
   a first memory storing a first database, the first memory including hardware located at a first location;
   a second memory storing a second database, the second memory including hardware located at a second location remote from the first location;
   a third memory including hardware located at a third location remote from the first and second locations; and
   a target server including hardware located at the third location, wherein the target server is configured to:
   perform first operations in parallel, the first operations comprising:
      cause a first database backup to be created by backing up the first database;
      cause a second database backup to be created by backing up the second database;
      initiate receipt of the first database backup of the first database from the first location;
      initiate receipt of the second database backup of the second database from the second location;
      create an initial first container that hosts remote data from the first database backup, the first container including software and dependencies;
      create an initial second container that hosts remote data from the second database backup, the second container including software and dependencies;
      determine whether or not a local database exists and, in response to determine that the local database exists, restore the local database to a target database and, in response to determine that the local database does not exist, create an empty database as the target database; and
      merge the remote data from the first container and the remote data from the second container in a target database stored in the third memory;
      wherein receipt of remote data from the first remote database backup and remote data from the second remote database backup comprises beginning to receive each remote database backup upon completion of that remote database backup being created;
      wherein create the first container and the second data container comprises beginning to create each container upon receipt of the remote data for that container;
      wherein merge the remote data from first container and the remote data from the second data in a target database comprises beginning to merge the remote data from each container upon completion of creating that container; and
      wherein timing of the receive, create, and merge for each remote database is independent of timing of the receive, create, and merge of each other remote database.

18. The system of claim 17, further comprising a fourth memory storing a fourth database, the fourth memory located at a fourth location remote from the first, second, and third locations, wherein the target server is further configured to:
   initiate receipt of a third database backup of the fourth database from the fourth location;
   create a third container that hosts remote data from the third database backup; and
   merge the remote data from third container in the target database.

19. The system of claim 17, wherein a local database is stored at the third location, the target server further configured to merge local data from the local database in the target database.

* * * * *